UNITED STATES PATENT OFFICE 2,471,626

PRESERVATION OF EGGS BY FREEZING

Socrates A. Kaloyereas, Baton Rouge, La., assignor to Board of Supervisors of Louisiana State University and Agricultural and Mechanical College, Baton Rouge, La.

No Drawing. Application September 13, 1947, Serial No. 773,923

5 Claims. (Cl. 99—196)

This invention relates to the preservation of eggs in their unbroken shells, by freezing, and the main object of the invention is to so pretreat the eggs that the shells will not become broken during freezing.

It is well known that present methods of freezing eggs to preserve them require the breaking of the shells and the removal of the contents. After removal from the shell it is common practice to stir the contents to break the membranes, and add some stabilizing material such as salt, sugar or corn syrup, for the retention of the original consistency of the yoke on thawing. Such method of freezing does not yield a product suitable for home consumption, and for this reason the total output of frozen eggs is used exclusively at present by bakers, candy manufacturers, hotels, restaurants, the armed forces, etc.

Eggs in the shell can at present be preserved only at temperatures above the freezing point of water, and by ordinary cold storage. During such storage, however, changes occur in the egg contents which reduce their marketing quality. There occurs especially a displacement of the yoke, a weakening of the vitelline membrane, and the development of off odors and flavors.

I have discovered a method by which eggs can be frozen in the shell without the cracking or breaking of the shell during the freezing operation. The eggs frozen by this method after thawing taste like ordinary fresh eggs. The egg yolk, however, has a waxen consistency. No detectable changes occur through the use of this new process of freezing, except in the relative proportions of bound water to free water of the whole egg content. I have found that by a simple process of dehydration at ordinary temperatures, or preferably in a cool room, I can decrease the weight of the eggs by about 5% or more, or otherwise reduce the ratio of free water to bound water content, and therefore the egg shells do not break or crack during freezing.

Within the egg shell there is a limited space for expansion, and this is sufficient to permit of the expansion of the reduced amount of free water during the freezing process.

The reduction in the ratio of free water to bound water is preferably effected by evaporation of a portion of the free water through the shell of the egg. To facilitate such evaporation it is preferable that the eggs be first dipped in an acidified water solution, which increases the porosity of the shell. The eggs are then removed from the solution and wiped dry, and the evaporation of water is effected. This evaporation is preferably effected by placing the eggs in a vacuum chamber, and preferably in the presence of dehydrating agents such as phosphorous pentoxide, calcium chloride, drierite, etc., and the evaporation is permitted to continue until the eggs lose about 5% or more of their weight. Either the vacuum or the dehydrating agents may be employed without the other. The partial dehydration can be effected by allowing the eggs to dry in a drying chamber containing the dehydrating agents, and without the use of a vacuum, or it can be effected by passing dry air over the eggs.

The washing of the eggs in an acidified water solution is not essential and may be replaced by any other method of removing the porphyrin membrane of the egg shell, or in some cases this step may be entirely omitted, although it is preferably employed because it reduces the time required for the dehydration.

Other means may be employed for reducing the ratio of free water to bound water in the content of the eggs as a preliminary operation to freezing. For instance, the eggs may be placed in a solution of sugar, pectin, gelatin, or similar agent which by diffusion into the egg will act to reduce the free water content.

Although it is preferable to effect a reduction of 5% in weight during the dehydration, this reduction should not ordinarily be over 10%. A reduction in weight of less than 5% leaves an amount of water in the egg which might cause cracking during freezing. An evaporation of such an amount of water as would result in more than 10% reduction by weight lowers the quality of the product and substantially increases the processing cost. Approximately a 5% or slightly greater reduction in weight appears to be the most satisfactory from all standpoints.

The degree of vacuum employed is not critical and is merely proportional to the time required. If no vacuum is employed the dehydration requires a longer time, and may be effected in various ways, as for instance by an air blast or by exposure to a cold atmosphere above 32° F., with or without dehydrating agents. Prewashing in weak acid speeds up the dehydrating action. Eggs having thick shells require a little longer time to effect the desired dehydration.

No special apparatus is required, but preferably the eggs are so supported that during the dehydrating step and during the freezing step each egg has the maximum of exposed surface. Both steps may be performed in the same apparatus, but preferably separate units are employed.

The process may be a batch operation with a given number of eggs for each batch, or may be a continuous one, in which the eggs pass through a dehydrating chamber and through a freezing chamber in succession, and at such rates and for such times in each chamber as will effect first the desired dehydration and then the desired freezing.

Having thus described my invention what I claim as new and desire to secure by Letters Patent is:

1. The process of treating unbroken eggs preparatory to storage under low temperature, which includes subjecting the eggs to dehydration thereby to evaporate water from the contents through the shells until the weight of the eggs has been reduced by from 5% to 10%, and thereafter freezing the partially dehydrated eggs, whereby expansion of the contents within the shells, which takes place during freezing, does not break the shells.

2. The process as defined in claim 1 and in which the unbroken eggs are preliminarily treated with a dilute acid to remove the porphyrin membrane of the shell, thereby to increase the porosity of the shell and facilitate the evaporation of water therethrough.

3. The process as defined in claim 1, in which the dehydrating is effected by the action of a vacuum.

4. The process as defined in claim 1, in which the dehydrating is effected by the action of a dehydrating compound.

5. The process as defined in claim 1, in which the dehydrating is effected by the action of a vacuum while in the presence of a dehydrating compound.

SOCRATES A. KALOYEREAS.

REFERENCES CITED

The following references are of record in the file of this patent:

UNITED STATES PATENTS

| Number | Name | Date |
|---|---|---|
| 2,278,472 | Musher | Apr. 7, 1942 |
| 2,419,877 | Birdseye | Apr. 29, 1947 |

FOREIGN PATENTS

| Number | Country | Date |
|---|---|---|
| 12,642 | Great Britain | 1905 |